(12) United States Patent
Rueb

(10) Patent No.: US 12,028,504 B2
(45) Date of Patent: Jul. 2, 2024

(54) PROJECTION SYSTEM FOR DIRECTING AND MONITORING ACTIVITY IN LARGE SCALE FACILITIES

(71) Applicant: VIRTEK VISION INTERNATIONAL, INC., Waterloo (CA)

(72) Inventor: Kurt D. Rueb, Kitchener (CA)

(73) Assignee: Virtek Vision International, Inc., Waterloo (CA)

(*) Notice: Subject to any disclaimer, the term of this patent is extended or adjusted under 35 U.S.C. 154(b) by 0 days.

(21) Appl. No.: 17/675,553

(22) Filed: Feb. 18, 2022

(65) Prior Publication Data

US 2022/0272314 A1 Aug. 25, 2022

Related U.S. Application Data

(60) Provisional application No. 63/151,668, filed on Feb. 20, 2021.

(51) Int. Cl.
| | |
|---|---|
| *H04N 13/239* | (2018.01) |
| *G01B 11/00* | (2006.01) |
| *G01B 11/25* | (2006.01) |
| *G01C 11/02* | (2006.01) |
| *G01S 17/89* | (2020.01) |
| *G06T 7/00* | (2017.01) |

(52) U.S. Cl.
CPC ......... *H04N 13/239* (2018.05); *G01B 11/002* (2013.01); *G01B 11/2545* (2013.01); *G01C 11/025* (2013.01); *G01S 17/89* (2013.01); *G06T 7/0006* (2013.01); *G06T 2207/10028* (2013.01)

(58) Field of Classification Search
CPC ... G01S 17/89; G01C 11/025; G01B 11/2545; G01B 11/002; H04N 13/239
See application file for complete search history.

(56) References Cited

U.S. PATENT DOCUMENTS

| | | | | |
|---|---|---|---|---|
| 2005/0058332 A1* | 3/2005 | Kaufman | ............... | G03B 35/00 382/133 |
| 2010/0309483 A1* | 12/2010 | Crowther | ............... | G01B 11/25 703/7 |
| 2017/0248406 A1* | 8/2017 | Shadmehri | ............. | G01B 11/25 |

* cited by examiner

*Primary Examiner* — On S Mung
(74) *Attorney, Agent, or Firm* — Gregory D. DeGrazia; Miller, Canfield, Paddock and Stone

(57) ABSTRACT

A first projection device includes a first laser projector and a first measurement system. A second projection device includes a second laser projector and a second measurement system. The first projection device and the second projection device is interconnected with a controller. The controller is programmed with computer aided design data representative of a large scale work area and coordinates electronic interaction between the first projection device and the second projection device. The first projection device projects a first indicia that is detectable by the second measurement system and the second projection device projects a second indicia that is detectable by the first measurement system. The controller is adapted for determining relative position within three-dimensional coordinate system of the first projection device to the second projection device from the first indicia detected by the second measurement system and the second indicia detected by the first measurement system.

10 Claims, 4 Drawing Sheets

PROJECTION SYSTEM FOR DIRECTING AND MONITORING ACTIVITY IN LARGE SCALE FACILITIES

PRIOR APPLICATIONS

The present application claims priority to U.S. Provisional Patent Application No. 63/151,668 filed on. Feb. 20, 2021, the contents of which are included herein by reference.

TECHNICAL FIELD

The present application relates generally toward a system and method for guiding activity in a large scale work area. More specifically, the present invention relates toward a plurality of projector devices capable of monitoring and projecting laser guides for directing activity in a large scale facility.

BACKGROUND

Laser projectors have been used to direct work functions in work cells for some time. For example, laser projectors have been used to project laser templates onto work surfaces with a great deal of success with respect to improving accuracy and reducing time to perform it worked function. However, the feasibility of using laser projectors in large spaces can be challenging.

For example, in large spaces including but not limited to large warehouses airplane fuselages, for more of manufacturing facilities, in large exhibition spaces the use of a laser projector has not proved feasible. Using a laser projector to project instructive indicia in large spaces fails for many reasons, but particularly when perspective is lost when projecting long angular distances.

By way of example, when preparing an exhibit space in a convention center, it is necessary to partition the space for individual exhibitors while also guiding preparations for the delivery of materials necessary for the individual exhibits. Merely mapping out exhibitor space often takes weeks to coordinate. In fact, masking tape is often used to layout individual exhibitor spaces. The time required to do so can significantly impact the number of events that may be held at a particular Convention Center. In addition to establishing location of individual exhibitor spaces, it is also desirable to direct movement, or track location of vehicles and workers to safely guide work functions.

As set forth above, laser projectors have been used to direct assembly of large structures such as, for example, prefabricated roof trusses. In this example, a laser projector is mounted above a work surface, typically on a ceiling, to direct the assembly of the roof trusses. The laser projectors project template patterns to guide workers in the assembly of the truss members. Additionally, the projectors can direct the connection of nailing plates on large tables which are often hundreds of feet in length. Similar systems are used to guide the assembly of large structures for wind energy, components of an aircraft, and even a fairing of a rocket.

For general use in a large work area, laser projectors have proven insufficient. Often, large objects disposed within the work area obstruct a view of the laser projector rendering a ceiling mounted system inoperable. Still further, movement of people and materials within the large work area obscures laser projection and locating systems causing a significant amount of error. The use of targets fixed in known locations in the work area within view of the laser projector have been used to locate a given projector within the work area. However, movement of the targets or obstructing view of the laser projector of the target can again render a laser projector inoperable. In addition, for very large spaces establishing, measuring and maintaining a sufficient quantity of known target locations can be extremely expensive or infeasible.

Therefore, it would be desirable to integrate the efficiencies of a laser projector, until now, only used in limited production spaces with large work areas. However, unique and novel integration techniques have yet to be developed.

SUMMARY

A first projection device includes a first laser projector and a first measurement system. A second projection device includes a second laser projector and a second measurement system. The first projection device and the second projection device is interconnected with a controller. The controller is programmed with computer aided design data representative of a large scale work area and coordinates electronic interaction between the first projection device and the second projection device. The first projection device projects a first indicia that is detectable by the second measurement system and the second projection device projects a second indicia that is detectable by the first measurement system. The controller is adapted for determining relative position within the three dimensional coordinate system of the first projection device to the second projection device from the first indicia detected by the second measurement system and the second indicia detected by the first measurement system.

The capability to determine relative position between first and second projection devices, enables the devices to project cohesive indicia in a coordinated manner eliminating the need for physical templating and the like. The system of the present application enables the accurate coordination of projected patterns from multiple projection devices so that large areas and to surfaces may receive the benefit of guided activity by way of laser projection while requiring only minimal preparation of the projection area, with the primary installation effort limited to physical installation of the projectors and providing a suitable communication means.

BRIEF DESCRIPTION OF THE DRAWINGS

Other advantages of the present invention will be readily appreciated as the same becomes better understood by reference to the following detailed description, when considered in connection with the accompanying drawing, wherein.

DETAILED DESCRIPTION

Figure 1:
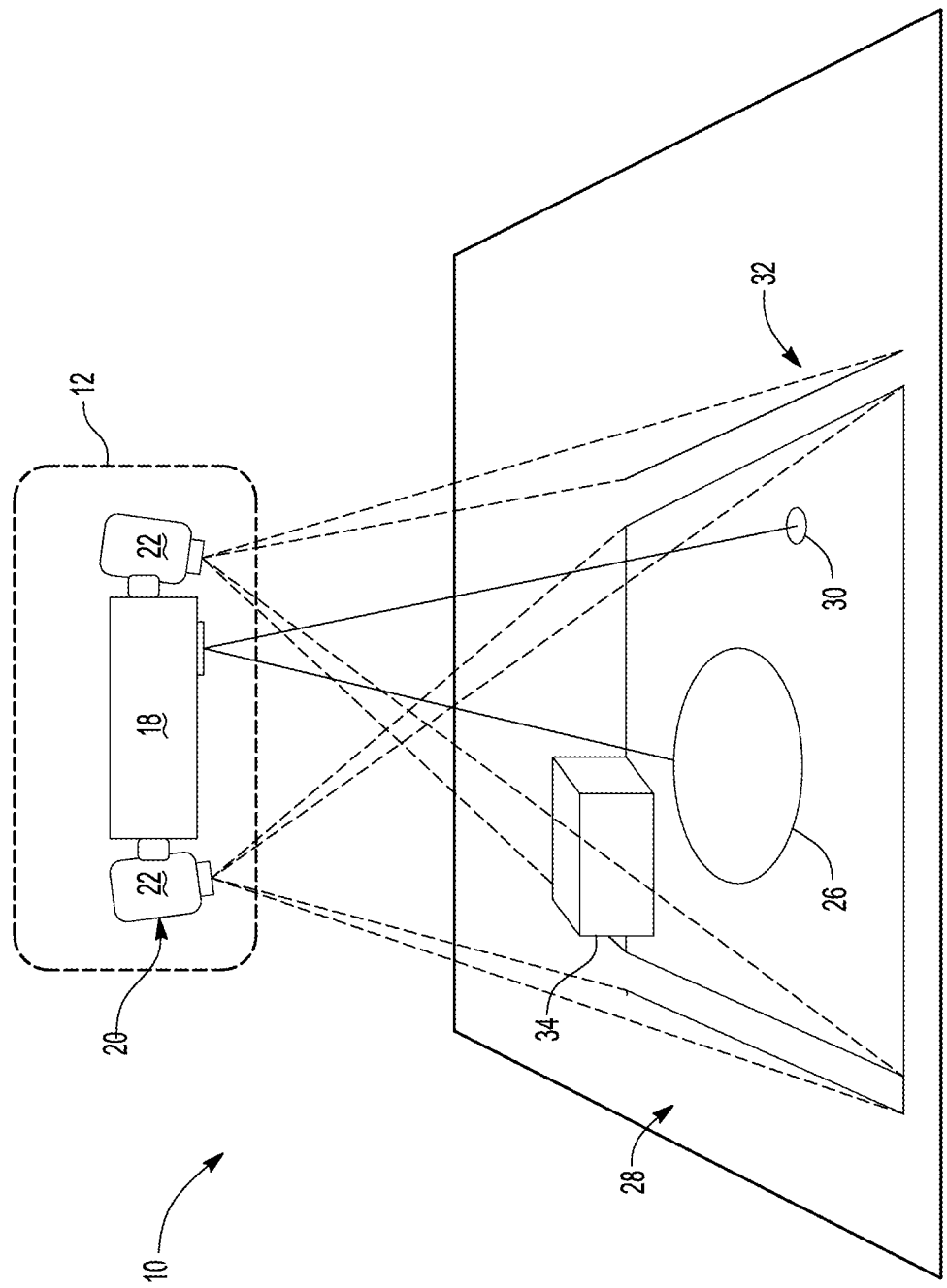
FIG. 1 shows an environmental schematic view first projection device of present application.
Figure 2:
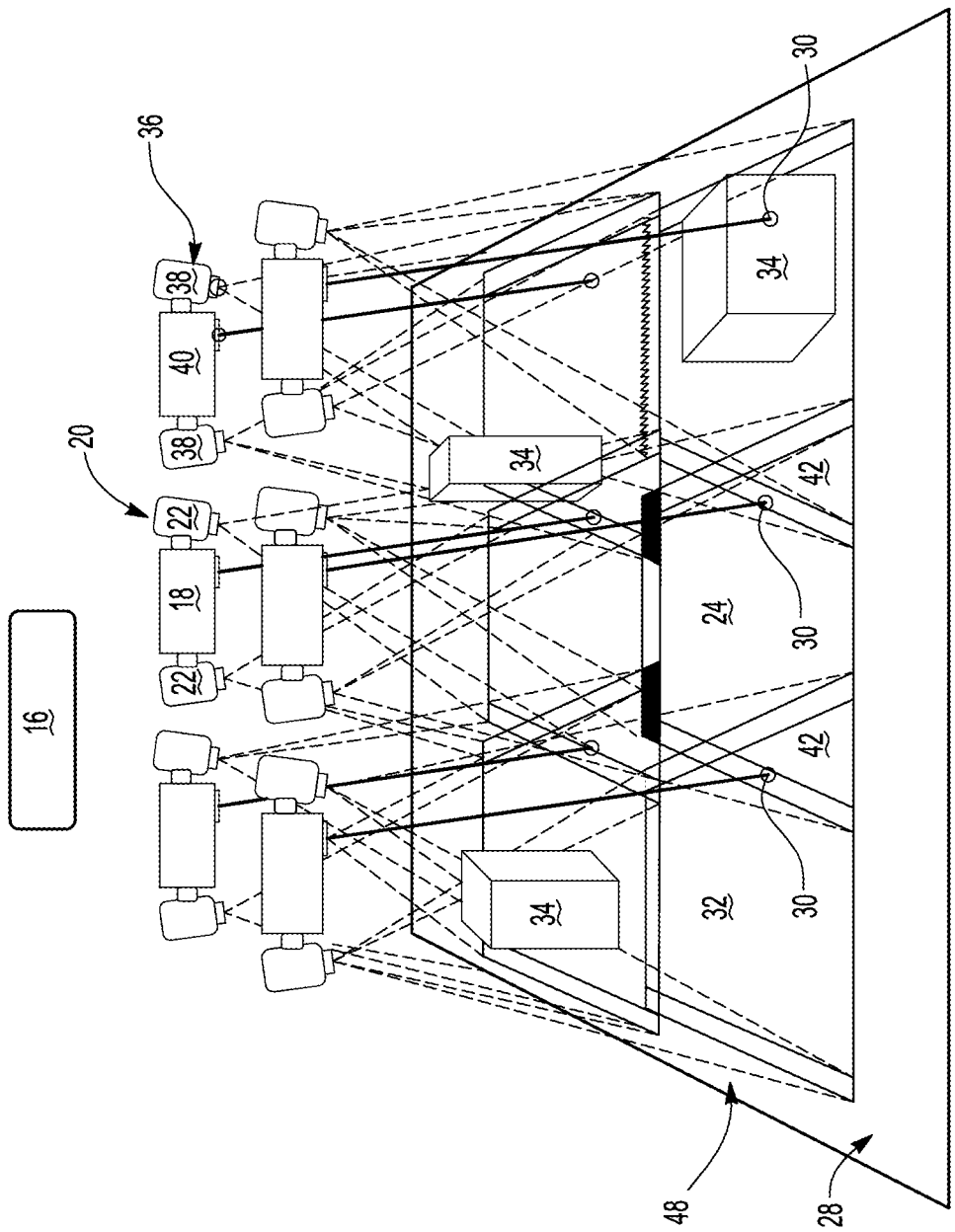
FIG. 2 shows an environmental schematic view a projection system of present application.
Figure 3:
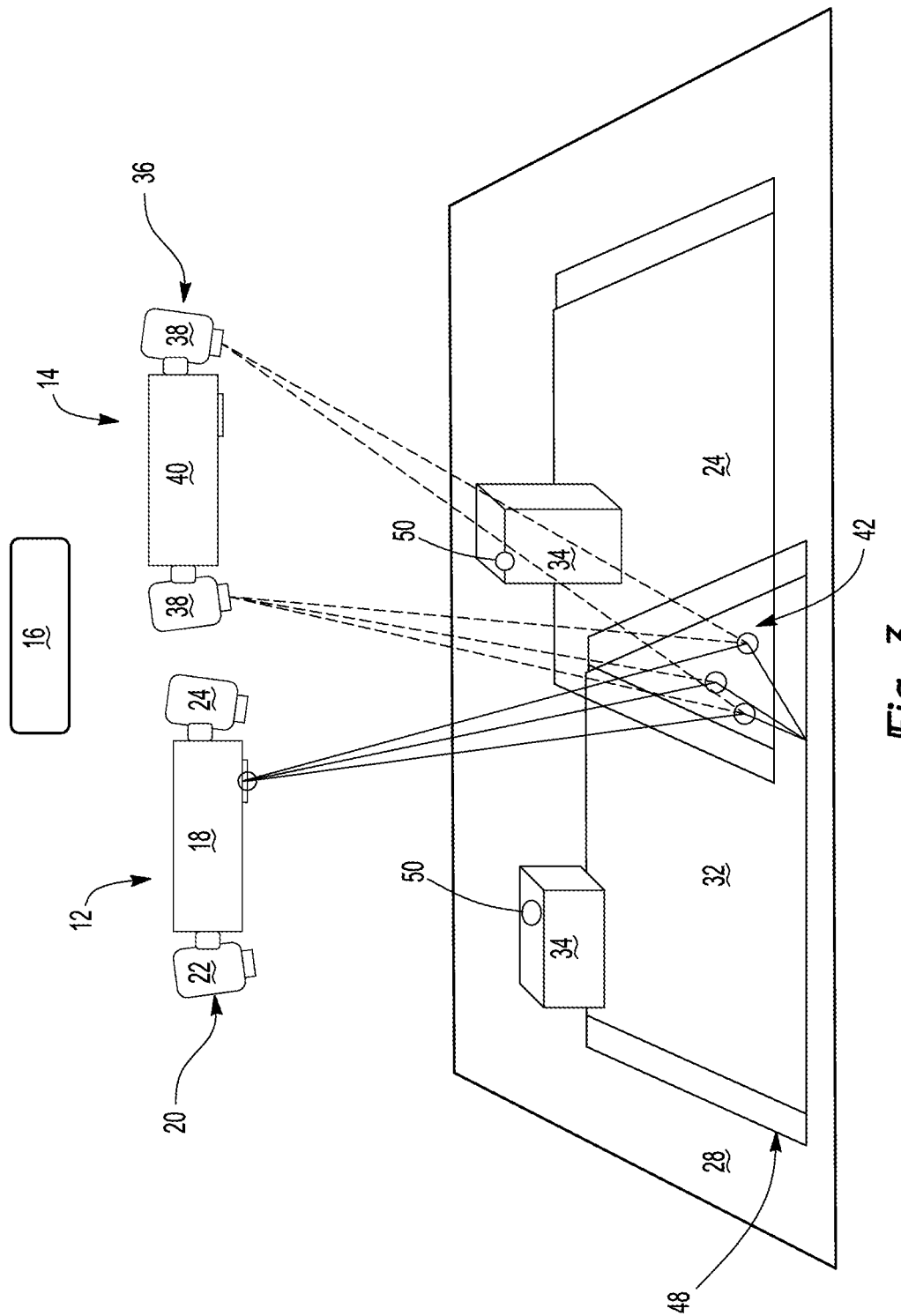
FIG. 3 shows an environmental schematic view of a projection system of the present invention with overlapping indicia projection.
Figure 4:
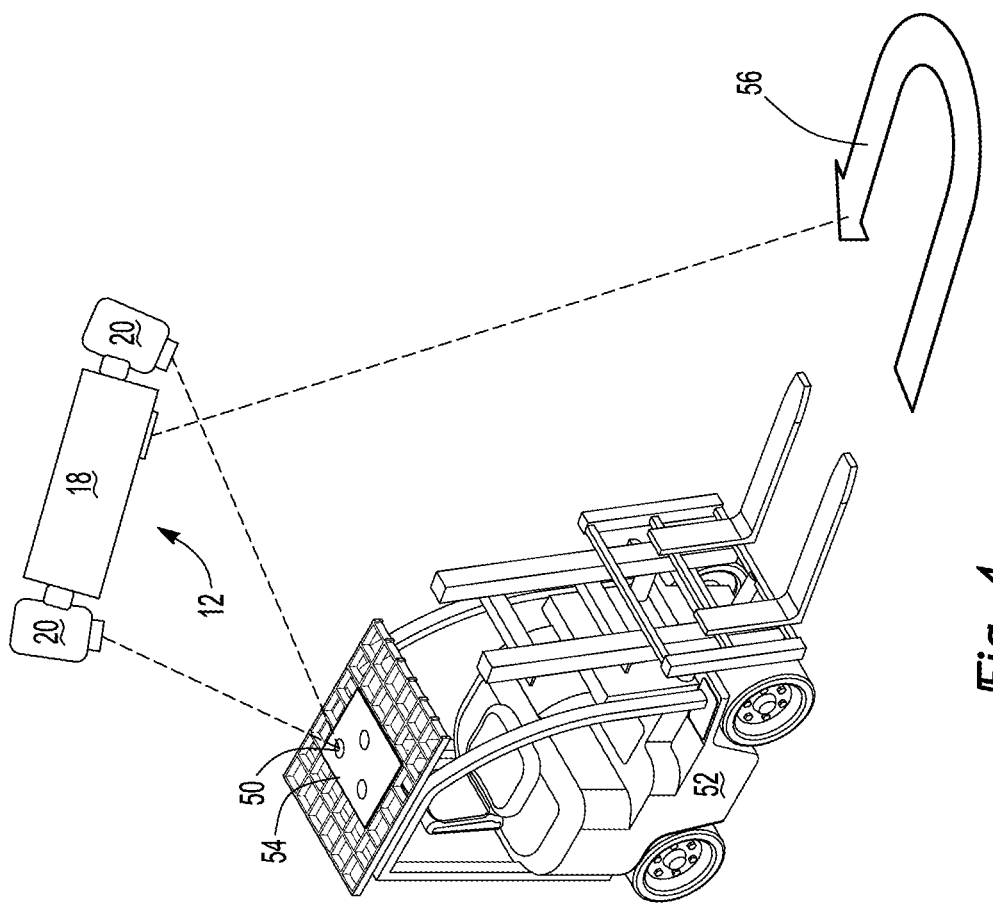
FIG. 4 shows a laser projection device projecting direction indicia for a delivery vehicle.

Referring now to FIG. 1, a projection system of the present application is generally shown at 10. The projection system 10 includes a first projection device 12. As will be explained further hereinbelow, the first projection device 12 is linked to a second projection device 14, and even a plurality of projection devices but way of a controller 16 (FIG. 2 and FIG. 3). It should be understood by those of ordinary skill in the art with each of the projection devices 12, 14 include the same components, but will be described in detail only with respect to the first projection device 12.

The first projection device 12 includes a first laser projector 18 and a first measurement system 20. In one embodiment, the first measurement system 20 includes first cooperable cameras 22. However, it should be understood the single camera may be used it is within the scope of this invention. The first laser projector 18 projects patterns 26 onto a work area 28 to guide assembly or direct operations and movement of content to a particular destination as will be explained further here in below. The pattern 26 can take the form of an outline of a work cell, template, indicial identification of an item, and the like. In addition, the first projector 12 may project laser spots 30 to arbitrary locations within the work area 28. The controller 16 receives data from the first measurement system 20 that identifies a location within the three-dimensional coordinate system of the first projection device 12 from an image of the laser spots projected to arbitrary locations within the work area 28.

The measurement system 20 defines a first referenced fame 32, the scope of which is defined by a direction and field of view of first cooperable cameras 22. Therefore, the first reference frame 32 is merely the area within the field of view of the measurement system 20 in which any object 34 may be measured.

In one embodiment, the first projection device 12 is mounted in a stable location, such as on a ceiling of a facility so that the field of view 32 of the measurement system 20 is directed onto a floor or other work service defining the work area 28. Referring now to FIG. 3, it should be understood that a plurality of projection devices 12, 14 are mounted on a ceiling in a configuration that provides the first measurement system 20 and a second measurement system 36 review of the work area 28. The second measurement system 20 defines a second reference frame 24 in a similar manner as does the first measurement system 20 defines a first reference frame 32. Likewise, the first laser projector 18 of the first projection device 12 and a second laser projector 40 of the second projection device 14 are provided a view of the work area 28.

The system 10 is enhanced by including coordinated views of the first measurement system 20 and the second measurement system 36. In similar manner as the first measurement system 20, the second measurement system 36 includes second cooperable cameras 38. Thus, the system 10 is enhanced but use of multiple sensors included in the first and second cooperable cameras 22, 38 that each include CMOS or CCD sensors. In one embodiment, the VPS1 laser projector device of Virtek Vision International, Inc described in U.S. Pat. No. 9,200,899 is selected, the contents of which are included herein by reference. However, it should also be understood that cameras may be separate from the laser projector or that a single camera may be used so long as reference frame or multiple references frames may be established for each of the projection devices 12, 14.

As set forth above, each of the plurality of projector devices 12, 14 is spaced throughout the work area 28 and are interconnected to the controller 16. The electronic connection is either wireless for simplicity making use of Wi-Fi or Bluetooth technology or is hardwired via Ethernet network. Each of the plurality of projector devices 12, 14 maybe arbitrarily positioned because there is no requirement to predetermine or otherwise set defined arrangements of the projector devices 12, 14. So long as the first reference frame 32 in the second reference frame 24 present an overlap 42 the plurality of projector devices 12, 14 need no relative location to be established as will be explained further hereinbelow.

The first projection device 12 establishes a first reference frame 32 and the second projection device 14 establishes page second reference frame 24. When the controller 16 identifies the reference frames 32, 24 are established, each of the first laser projector 18 projects a first indicia 44 and the second laser projector 40 projects a second indicia 46 in two the overlap 42 between the first reference frame 32 and the second reference frame 24. It should be understood that each indicia, 44, 46 is unique to the projection device 12, 14 from which it is projected. The indicia 44, 46 maybe a unique pattern or icon.

Because the overlap 42 is visible to each of the first measurement system 20 and the second measurement system 36, the first measurement system 20 views the second indicia 46 originating from the second projection device 14 and the second measurement system views the first indicia originating from the first projection device 12. The controller 16 uses the measurements established by each of the first and second measurement system 20, 36 to determine a relative position between the first projection device 12 and the second projection device 14, and any number of adjacent projection devices spread throughout a facility. Each of the projection devices 12, 14 include a unique indicia by projecting a unique laser image into the overlap 42. Thus, adjacent projection devices 12, 14 as shown in FIG. 3, can identify which adjacent projection device 12, 14 is projecting indicia into the overlap 42. Once the indicia 46 of an adjacent projection device 14 has been detected by measurement system 20 of a different projection device 12, the measurement system 20 signals the controller 16 to correlate a location of the devices in a three dimensional coordinate system established by the location of the indicia. By interconnecting a plurality of projection devices, five, six, seven or more, a global reference frame 48 maybe established by the controller 16. In this way, the controller 16 establishes a global reference frame throughout the facility in which the system 10 allows the projection devices to coordinate projection of work patterns 26 throughout the facility that are located in accurate relative positions. The process of accurately combining the observation of the indicia 44, 46 into a global reference frame 48 can be implemented through adaptation of open source software such as the Ceres solver, http://www.ceres-solver.org/index.html, employed by Google to build 3D models for mapping purposes. Replacing the use of passively detected image features with the actively projected and associated indicia 44, 46 along with the precision and accuracy of projection devices 12, 14 such as the previously identified VPS1 laser projector provides a stable, reliable and accurate global reference frame. In addition, since the alignment is based on the projected indicia 12, 14, the projection of each device 12, 14 is also referenced to the same coordinate reference, and projected patterns can accurately span the entire area encompassed by the global reference frame 48.

With respect to the unique indicia 44, 46 projected into the overlap 42, it is also possible to determine identify each indicia 44, 46 by projecting the indicia 44, 46 in a specific timed sequence. As such, unique combinations of spatial patterns and/or temporal sequence are believed to enhance identification of each indicia 44, 46. When process length is not particularly relevant, each measurement system 36, 20 images the overlap 42 followed by the first projection device 12 projecting a single laser spot. After projection of the single laser spot, each of the plurality of measurement systems 36, 20 generate a new image of the overlap 42 including the laser spot signaling the controller 16 to compare the new image with the prior image generated before projection of the single laser spot.

Once a reference frame 32, 24 is established and correlated to each individual projection device 12, 14, the reference frame 32, 24 can also be used to correct for distortions, misalignments, or drift in the projected work pattern 26 caused by any individual projector device 12, 14. In this manner, the system 10 is optimized for general correction of the work pattern 26 to adjust for electronic drift in the projector device 12, 14 or a shifting in the mounting location due too, for example, wind loading on a building, equipment vibrations, and the like.

These location corrections are based on the measured work area 28 that establishes the local reference frame 32, 24 for each projection device 12, 14. This procedure also simplifies and decouples the compensation of each individual projector device 12, 14. Therefore, the complexity that might be caused during the process of fitting local reference frames into a global reference frame by way of manual correlation is completely eliminated. The generation of the global reference frame 48 occurs upon initial installation of the system 10 or when in addition or replacement of a projection device to the work area 28 is made. Through implementation of the local reference frames 32, 24 the complexity of making corrections in the projection of patterns 26 is completely eliminated.

As set forth above, each projection device 12, 24 includes a unique indicia 44, 46 such as, for example, triangles with absolute lengths come up unique triangle edges for other images that are distinguishable from other indicia 44, 46. The use of unique patterns that make up each indicia 44, 46 allows for simultaneous projection from all of the projection devices 12, 14 to simultaneously locate each projector device 12, 14 within the entire work area 28. It is further contemplated that to avoid interference with other visual features projected into the work area 28, the indicia maybe projected in sequence and then subtracted from background features as required until each of the projected indicia 44, 46 are clearly identified by the controller 16. Alternatively, the indicia 44, 46 can be displayed one at a time by each projection device 12, 14. Each of the indicia can then be observed in seriation by the remaining measurement systems of the remaining projection devices so that the detected indicia 44, 46 then identified by the specified sequence.

During the final stage of the installation, the global reference frame 48 may be adjusted to match an external reference such as, for example, a coordinate system of a CAD model of the work area 28. In one embodiment, the global reference frame 48 is partly constrained by the floor of the work area 28 and only the relative position and orientation of each projection device 12, 14 will require any electronic or manual adjustment. The location of a global reference frame 48 within the three dimensional coordinate system can also be established by identifying two or more reference features such as objects 34 with known three dimensional coordinates within the work area 28. For example, the VPS1 laser projector described hereinabove tracks patterns of retro reflective material to measure a location either by laser scanning or illumination by a secondary light source followed by detection by the first and/or second measurement system 20, 36. In one embodiment, a handheld probe having retroreflective material is used to identify alignment reference locations in the work area 28. Alternatively, permanent retro reflective targets 50 are placed at reference locations such as, for example, on the identifiable objects 34 to provide a permanent built-in reference for the desired coordinate frame. The identifiable objects 34 include fixed building features or other objects placed in known locations. Therefore, it should be understood that a reference marker (either target or identifiable object) is disposed in a known location within said three dimensional coordinate system so that at least one of the first projection device 12 and said second projection device 14 registers its location within the three-dimensional coordinate system from a scan of the reference marker by the at least one of the projection devices 12, 14.

A method for using the system 10 is now explained. When preparing the work area 28 for a trade show or conference, for example, the boundaries of show booth are simply projected simultaneously from all of the plurality of projection devices 12, 14 across the entire global reference frame 48. Therefore, and entire work area 28 receives a laser projected layout identifying relative positions of every component included in the trade show or conference. Preparation for laser projection of the patterns 26 identifying locations of the components is achieved by merely programming the controller 16 with the CAD data of the desired locations. Once the controller 16 is programmed it signals the system 10 to identify relative positions of the projection devices 12, 14 and then project the patterns 26 to CAD directed locations within the three-dimensional coordinate system defined by the system 10.

A more sophisticated use of the system 10 is achieved by providing dynamic guidance of, for example, a forklift operating within the work area of 28. In this embodiment, the retro reflective targets 50 or a fixed 2 the forklift 52 their location visible by each of the plurality of projection devices 12, 14. In one embodiment, the retro reflective targets 50 affixed two of the forklift 52 or disposed in a predetermined pattern 54 that is recognizable by the measurement systems 20, 36 when signaled to the controller 16. Once the pattern 54 is recognized, movement of the forklift 52 is traced in real time throughout the global reference frame 48. Once traced, the projection devices 12, 14 project instructive patterns 26 such as, for example, arrow markers 56 onto the floor within the global reference frame 48 immediately in front of the moving forklift thus, the arrow marker 56 is used by a vehicle operator to direct the forklift 52 to its destination while also providing any other information required by the operator to complete his or her work task.

In an even more automated system, the vehicles are forklifts 52 here directly tracked and controlled by the controller 10 by way of the projection devices 12, 14 without the use of an operator or wires in the floor. The vehicle 52 is guided by mapping the work area of 28 obtained during the generation of the global reference frame 48 by the system 10. Thus, CAD data is integrated to the controller 16 and the projection devices 12, 14 both track location and movement of the forklift 52 while directions are wirelessly transmitted to the forklift 52. Alternatively, the forklift 52 includes a vision system that monitors patterns 54 projected onto the floor thereby directing the forklift 52 in a following sequence. In either embodiment, as the forklift 52 travels from the first reference frame 32 to the second reference frame 24 projection of the arrow marker 56 transitions from the first projection device 12 to the second projection device 14 throughout the entire global reference frame 48.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

What is claimed is:

1. A laser projection system for guiding activity in a work area, comprising:
    a controller;
    a first projection device including a first laser projector and first measurement system, and a second projection device including a second laser projector and a second measurement system, said first projection device and said second projection device being electronically interconnected through said controller;
    said first projection device projecting a first indicia being detectable by said second measurement system and said second projection device projecting a second indicia being detectable by said first measurement system;
    said controller determining relative position within a three dimensional coordinate system of said first projection device and said second projection device from said first indicia detected by said second measurement system and said second indicia detected by said first measurement system; and
    said controller generating a global reference frame correlated to a coordinate system of a Computer Aided Design (CAD) model of the work area from the determined relative position of said first and said second projection device.

2. The system set forth in claim 1, wherein said first measurement device defines a first reference frame and said second measurement device defines a second reference frame being disposed in a relative position to said first projection zone.

3. The system set forth in claim 2, wherein said first reference frame defines an overlap with said second reference frame.

4. The system set forth in claim 3, wherein at least one of said first laser projector and said second laser projector being oriented for projecting indicia into said overlap whereat said indicia projected into said overlap is detectable by both said first measurement device and said second measurement device.

5. The system set forth in claim 1, further including a reference marker being disposed in a known location within said three dimensional coordinate system whereby at least one of said first projection device and said second projection device registers its location within the three dimensional coordinate system from a scan of said reference marker.

6. The system set forth in claim 1, wherein said controller is coded with Computer Aided Design data representative of the work area and said first projection device and said second projection device project guides is directed by said controller from said CAD data and relative position within a three dimensional coordinate system of said first projection device and said second projection device.

7. The system set forth in claim 1, wherein said first indicia projected by said first laser projector is unique to said first projection device and said second indicia projected by said second laser projector is unique to said second projection device.

8. The system set forth in claim 1, wherein said first indicia projected by said first laser projector said second indicia projected by said second laser projector comprises arbitrary laser spots.

9. The system set forth in claim 1, wherein at least one of said first projection device and said second projection device identify a location disposition within the three-dimensional coordinate system by measurement of an object disposed in a known location within said three dimensional coordinate.

10. The system set forth in claim 1, further including a target being disposed in a known location within the work area within view of at least one of said first measurement system and said second measurement system for registering a location of at least one of said first projection device and said second projection device within the three dimensional coordinate system.

* * * * *